United States Patent [19]
Kalata et al.

[11] Patent Number: 4,864,216
[45] Date of Patent: Sep. 5, 1989

[54] LIGHT EMITTING DIODE ARRAY CURRENT POWER SUPPLY

[75] Inventors: Steven Kalata, Sunnyvale, Calif.; Donald M. Reid, Corvallis, Oreg.; Charles A. Brown, Corvallis, Oreg.; Billy E. Thayer, Corvallis, Oreg.

[73] Assignee: Hewlett-Packard Company, Palo Alto, Calif.

[21] Appl. No.: 300,004

[22] Filed: Jan. 19, 1989

[51] Int. Cl.$^4$ .............................................. G05F 3/26
[52] U.S. Cl. .................................... 323/315; 323/316; 323/317; 307/296.6; 346/107 R; 346/108; 354/5; 354/7
[58] Field of Search .............................. 323/311–316, 323/317; 307/296 R, 297, 31–33, 38; 346/107 R, 108, 154, 139 R; 354/5, 7

[56] References Cited

U.S. PATENT DOCUMENTS

| | | | |
|---|---|---|---|
| 4,270,092 | 5/1981 | Christopherson | 323/316 X |
| 4,605,892 | 8/1986 | Seevinck et al. | 323/315 |
| 4,739,246 | 4/1988 | Thomson | 323/316 X |
| 4,780,730 | 10/1988 | Dodge et al. | 346/139 R X |
| 4,780,731 | 10/1988 | Creutzmann et al. | 346/107 R X |

OTHER PUBLICATIONS

Paul R. Gray, Robert G. Meyer; Analysis and Design of Analog Integrated Circuits, Second Edition, 1977, 1984, John Wiley & Sons, pp. 736, 737.

Primary Examiner—Patrick R. Salce
Assistant Examiner—Emanuel Todd Voeltz
Attorney, Agent, or Firm—Patrick J. Barrett

[57] ABSTRACT

A power supply circuit for an LED print head has a reference current source connected to a printer system reference voltage for providing a second reference voltage for an individual, integrated circuit chip. A plurality of substantially similar field effect transistors have their gates connected to the chip reference voltage for providing substantially similar current to each of a plurality of light emitting diodes. The current is enabled to each such LED by the presence or absence of a data signal. A reference resistor in the reference current source permits adjustment so that each of a plurality of integrated circuit chips can provide substantially similar current to each of a plurality of LED dice, or adjust the current level, if required, to achieve similar light output from each LED.

18 Claims, 1 Drawing Sheet

LIGHT EMITTING DIODE ARRAY CURRENT POWER SUPPLY

BACKGROUND OF THE INVENTION

It has become desirable to employ non-impact xerographic-type printers for text and graphics. In such a printer, an electrostatic charge is formed on a photoreceptive surface of a moving drum or belt, and selected areas of the surface are discharged by exposure to light. A printing toner is applied to the drum and adheres to the areas having an electrostatic charge and does not adhere to the discharged areas. The toner is then transferred to a sheet of plain paper and is heat-fused to the paper. By controlling the areas illuminated and the areas not illuminated, characters, lines and other images may be produced on the paper.

One type of non-impact printer employs an array of light emitting diodes (commonly referred to herein as LEDs) for exposing the photoreceptor surface. A row, or two closely spaced rows, of minute LEDs are positioned near an elongated lens so that their images are arrayed across the surface to be illuminated. As the surface moves past the line of LEDs, they are selectively activated to either emit light or not, thereby exposing or not exposing, the photoreceptive surface in a pattern corresponding to the LEDs activated.

To form good images in an LED printer, it is desirable that all of the light emitting diodes produce the same light output when activated. This assures a uniform quality image all the way across a paper. The light output from an LED depends on a number of factors including current, temperature, and processing parameters for forming the LED which may affect its light output as a function of current.

Light emitting diodes for print heads are formed on wafers of gallium arsenide or the like, suitably doped to conduct current and emit light. Long arrays of LEDs are formed on a wafer which is cut into separated dice, each having an array of LEDs. A row of such dice are assembled end-to-end to form a print head array. The light output of the LEDs on a given die are usually reasonably uniform, however, there may be variations from die to die as processing parameters differ between dice. There is some variation within dice from an individual wafer and greater variation from wafer to wafer.

The LEDs are driven by power supplies on integrated circuit chips. The current output of these chips may also vary depending on processing parameters in making these chips. Such variations may compound the variations in the LED dice.

A parameter that is partly LED power supply dependent is the rise time for current flow. This is significant, since the exposure of the photoreceptive surface is a function of both intensity and illumination time. In an LED print head, there may be a few thousand LEDs across the width of the photoreceptive surface. The current in each LED may also be affected by the number of LEDs enabled at any time. Thus, there may be a relatively high current and concomitant higher light intensity or total exposure when a few LEDs are enabled, as compared with the current and light output when a very large number of LEDs are enabled.

It is desirable, therefore, to provide a power supply for an array of LEDs which assures uniform light output across the array and a light output substantially independent of differences in the number of LEDs enabled.

BRIEF SUMMARY OF THE INVENTION

There is, therefore, provided in practice of this invention according to a presently preferred embodiment, a power supply for a light emitting diode print head. The power supply is formed on a plurality of integrated circuit chips where each chip has a plurality of outputs for supplying current to each of a plurality of LEDs. Each such integrated circuit chip has a constant current source connected to a reference voltage for the entire print head. Preferably, a resistor is included in the constant current source for each chip to permit setting the current, and hence, a chip reference voltage for all of the LED current sources on the chip. A current is applied to each LED which is a function of the chip reference voltage on the respective chip and the presence or absence of a data signal for the respective LED.

In a preferred embodiment, such a power supply has a reference field effect transistor (FET) in the constant current source and a plurality of current source FETs substantially similar to the reference FET, with each current source FET having an output connected to a respective LED. The gates of all of the FETs are interconnected with the output of the reference FET so that each of the FETs passes the same current when enabled by a data signal for the respective LED.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

An exemplary LED print head has a row of 27 LED dice placed end-to-end to stretch across the width of a photoreceptive surface. Each die has 96 LEDs along its length. The LED dice are made in large numbers on a gallium arsenide wafer, which is then cut up to form the individual dice. It is found that there are variations in LED light output as a function of current from wafer to wafer, due to differences in processing variables. Generally speaking, all of the LEDs on a die are quite similar to each other in this characteristic. Dice from different wafers may differ appreciably in light output as a function of current. Dice from various portions of a wafer may fall somewhere in between. The light output from the LEDs on a large number of LED dice tends to have a more or less Gaussian distribution around a desired light output.

To minimize this source of non-uniformity in LEDs used in practice of this invention, the light output for each LED die is measured and the dice are sorted into collections or "bins" so that all of the dice in a given bin have a variation in light output much smaller than the variation occurring in the total population of LED dice. When a given print head is assembled, all of the dice are taken from a single bin so that the intrinsic light output as a function of current is substantially the same for all of the LEDs on that print head. What is next needed is a power supply that delivers the same current to each LED in the array.

Power is supplied to the LEDs from integrated circuit chips mounted in close proximity to the LED dice. In an exemplary embodiment, an integrated circuit chip is located on each side of each LED die and contains circuits for delivering current to half of the LEDs on the LED die. Thus, an exemplary integrated circuit chip may have 48 current sources for the respective LEDs. Such a chip may include a variety of other print head operational circuits which do not form a part of this invention. For example, data signal multiplexing circuits may be included on the chip.

Figure 1:
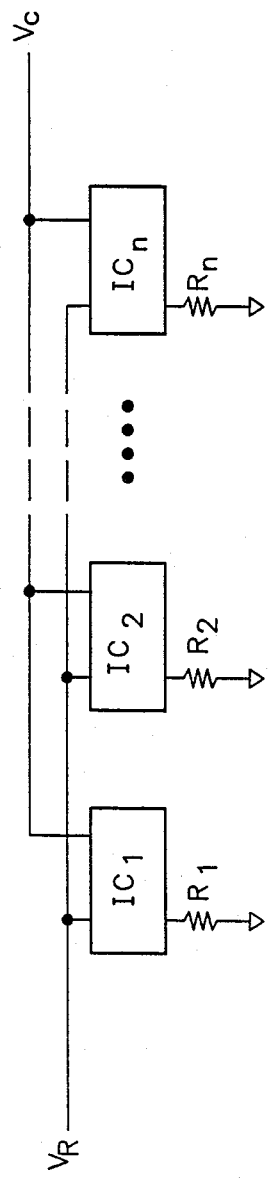
FIG. 1 illustrates in block form a plurality of integrated circuit chips for an exemplary power supply.

Thus, as indicated schematically in FIG. 1, there may be a row of integrated circuit chips $IC_1$, $IC_2$ . . . $IC_n$ mounted near a row of LED dice (not shown). A system reference voltage, $V_R$ is applied to each of the integrated circuit chips. The magnitude of the system reference voltage can be set so that the light output from a given LED print head achieves a desired level. For example, if the intrinsic light output from the set of LEDs on the print head is lower than the mean of the Gaussian distribution of light outputs, the reference voltage for that print head might be a higher value than for a print head having an intrinsic light output closer to th mean. Thus, by varying the system reference voltage, the light output of all of the LEDs in the array can be raised or lowered, as desired, in synchronism.

In addition to variations that may occur due to processing variables of the LED dice, there may be variations in the properties of the integrated circuit chips supplying power to the LEDs. The LED print heads are analog devices and such variations may be more significant than in digital circuits.

To compensate for such possible variations, each integrated circuit chip is provided with a reference resistor, $R_1$, $R_2$ . . . $R_n$, the value of which may be selected for assuring that all of the integrated circuit and LED sets on a given print head produce the same light output. It is desirable that the reference resistor be located external to the integrated circuit chip for selection at a late stage in assembly of a print head. Typical resistance values for the reference resistors lie in the range from 100 to 600 ohms. If desired, the reference resistors may be variable rather than being selected from a range of resistance values. It turns out in practice that careful selection and attention to manufacturing techniques produces sufficiently uniform light output that only occasional changes in resistance values may be appropriate.

Figure 2:
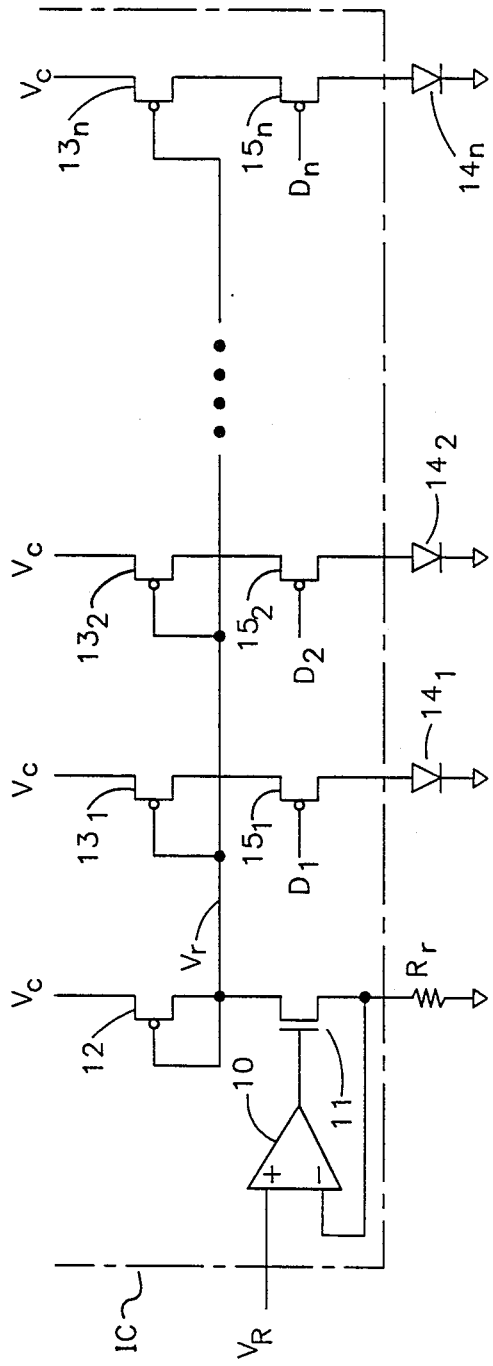
FIG. 2 illustrates an exemplary power supply circuit for such an integrated circuit chip.

A portion of the circuits on a representative integrated circuit chip are illustrated in FIG. 2. In this drawing, a phantom line indicates the portion of the circuit lying on the chip as distinguished from components such as a reference resistor $R_r$ which, as just mentioned, is preferably located off of the integrated chip. Contact pads for making connections to the chip are omitted, as are many other details of circuits on such a chip which are not material to an understanding of this invention.

The reference voltage, $V_R$, is applied to the non-inverting input to a difference amplifier 10 (commonly referred to as an op-amp) of a reference current cell on each chip. There is nothing remarkable about the op-amp current controller, and its internal circuits are, therefore, not illustrated. It comprises a conventional comparator circuit, an output buffer for the comparator, a compensation capacitor to prevent oscillations, and a bias circuit for the comparator and buffer. The op-amp circuits are formed by the same processes employed for the balance of the circuitry on the integrated circuit chips.

The op-amp output is connected to the gate of an n-channel insulated gate field effect transistor 11 (IGFET or FET, sometimes referred to as a JFET) which acts as a current regulator or current limiter. The source of the n-channel current regulator FET is connected to both the inverting input to the op-amp and the external reference resistor $R_r$. The drain of the current regulator FET is connected to the drain of a p-channel current source reference FET 12. The reference FET 12, as well as other components which provide current to the LEDs, are powered by a current supply voltage, $V_c$, common to the entire print head.

In the reference current cell the op-amp controls the gate of the n-channel current reference FET and increases or decreases the gate voltage until the voltage at the reference resistor matches the external reference voltage $V_R$ at the non-inverting input to the op-amp. The result is a chip reference current equal to $V_R/R_r$. Thus, the reference current cell produces a chip reference voltage $V_r$ at the drain of the reference FET 12. The internal or chip reference voltage $V_r$ is not the same as the external or system reference voltage $V_R$. The reference current cell, with selection of a reference resistor, effectively eliminates chip-to-chip output current variations due to normal variations in integrated circuit chip processing parameters. An exemplary operating range for the chip reference voltage is from zero to 2.5 volts for a current supply voltage $V_c$ of 5 volts.

The chip reference voltage $V_r$ is tied to the gate of the reference FET. It is also connected to the gate of each of a plurality of similar p-channel output driver FETs $13_1$, $13_2$ . . . $13_n$, which provide current for respective light emitting diodes $14_1$, $14_2$ . . . $14_n$ By having the gates of all of the output driver FETs 13 tied together to the chip reference voltage $V_r$, the current for each driver is substantially identical. These can be thought of as current mirrors with the same current flow as in the constant reference current cell, or if desired, scaled to a uniform different current by having different parameters for the output FETs 13 as compared with the parameters of the reference FET 12.

Each of the output drivers 13 is in series with a p-channel data FET $15_1$, $15_2$ . . . $15_n$. The data FETs act as switches in response to presence or absence of a data signal $D_1$, $D_2$ . . . $D_n$ applied to the gate of the respective data FET. By having independent drivers for each LED, the light output, rise time and the like is substantially identical for all of the LEDs. The current from each driver, and the respective rise and fall time, for each LED is substantially independent of the number of LEDs enabled. Nominal values for the reference resistor and chip reference voltage generate a nominal output current of about 5.0 milliamps. Average current may vary as little as ±3 percent. A variation as little as ±1 per cent can be achieved with somewhat poorer yield of end product.

The output or LED current can be maintained within ±0.5 per cent from nominal over a range of variation in the supply voltage $V_c$ in the order of ±0.25 volt from a nominal 5 volts. The design provided in practice of this invention permits the average light output across the whole print head to be adjusted by means of the system reference voltage $V_R$. A reference resistor, $R_r$, is used to adjust light output uniformity by adjusting individual integrated circuit/LED die pairs. Thus, there is one reference resistor for each of the integrated circuit chips employed in the print head.

Another important parameter in generating quality print is exposure time. In order to keep the exposure time the same regardless of the number of LEDs turned on, it is important to minimize the difference in rise and fall times with respect to the number of drivers enabled. The series data gate design, where each LED has a current mirror power source and a data switch, largely eliminates rise and fall time differences. These times may be the same within 20 per cent whether one or all of the drivers are turned on.

Although but one embodiment of power supply for an LED print head has been described and illustrated herein, many modifications and variations will be apparent to one skilled in the art. Thus, for example, instead of having a reference resistor off of the integrated circuit chip, such a resistor could be formed on the chip and trimmed as appropriate by conventional techniques.

The specific FETs and other parts of the power supply have been described in the preferred embodiment with certain characteristic parameters. It will be apparent that these are merely exemplary. For example, p-channel FETs are used in the drivers and it will be apparent that the circuits can be modified to use n-channel FETs MOSFETs, or bipolar transistors to accomplish the same purposes. It will, therefore, be understood that within the scope of the appended claims the invention may be practiced otherwise than as specifically described.

What is claimed is:

1. A power supply for a light emitting diode print head wherein the LEDs on the print head have substantially uniform light output as a function of current, comprising:
   a plurality of integrated circuit chips, each chip having a plurality of outputs for supplying current to each of a plurality of respective LEDs;
   means for applying a system reference voltage to each of the integrated circuit chips;
   means for generating a chip reference voltage for each of the plurality of chips in response to the system reference voltage; and
   means for applying a current to each LED output which is a function of the respective chip reference voltage and the presence or absence of a data signal for such LED output.

2. A power supply as recited in claim 1 further comprising means for setting the chip reference voltage for a respective chip to a value for equalizing current output for all of the integrated circuit chips.

3. A power supply as recited in claim 2 wherein the means for generating a chip reference voltage comprises a constant current source and a reference resistor for setting a constant current from such source.

4. A power supply as recited in claim 3 wherein the means for applying current for each LED comprises a data FET and a output driver FET in series, the gate of the output driver FET being connected to the chip reference voltage, and further comprising means for applying a data signal to the gate of the data FET.

5. A power supply as recited in claim 4 wherein the constant current source comprises a FET substantially the same as the output driver FETs and having the chip reference voltage applied to its gate.

6. A power supply as recited in claim 1 wherein the means for applying current for each LED comprises a data FET and a output driver FET in series, the gate of the output driver FET being connected to the chip reference voltage, and further comprising means for applying a data signal to the gate of the data FET.

7. A power supply for a light emitting diode print head comprising:
   a reference FET;
   a plurality of output driver FETs substantially similar to the reference FET, each having an output for connection to an LED;
   means for interconnecting the gates of all the FETs with the output of the reference FET;
   means for passing a constant current through the reference FET; and
   means for enabling current flow from each output driver FET to its respective LED in response to a data signal.

8. A power supply as recited in claim 7 wherein the means for passing a constant current comprises an op-amp regulated current source and a reference resistor for setting the current.

9. A power supply as recited in claim 7 wherein the means for enabling current flow comprises a data FET in series with each output driver FET and means for applying a data signal to the gate of the data FET.

10. A power supply for a light emitting diode print head comprising:
    a plurality of integrated circuit chips, each chip having a plurality of outputs for supplying current to each of a plurality of respective LEDs;
    means for applying a system reference voltage to each of the integrated circuit chips; means for applying a current source voltage to each of the integrated circuit chips; and
    a reference resistor connected to each integrated circuit chip; each such integrated circuit chip comprising:
       a reference current source connected to the system reference voltage for providing a chip reference voltage;
       a plurality of data transistors, each being connected to a respective LED output;
       means for applying a data signal to the gate of each data transistor;
       a plurality of output driver transistors connected to the current source voltage and to a respective data transistor; and
       means for connecting the chip reference voltage to the gate of each output driver transistor.

11. A power supply as recited in claim 10 comprising a reference resistor connected to the reference current source on each integrated circuit chip for setting the current in the reference current source on the respective chip.

12. A power supply as recited in claim 10 wherein each transistor is a field effect transistor.

13. A power supply as recited in claim 10 wherein the reference current source provides the reference voltage at the drain of a p-channel FET having its drain connected to its gate.

14. A power supply as recited in claim 13 wherein the output driver FETs are also p-channel FETs and each of the output driver FETs has its drain connected to a respective data FET source.

15. A method for obtaining uniform light output from a plurality of light emitting diodes on an LED print head comprising the steps of:

sorting a plurality of LED dice, each having a plurality of LEDs thereon, according to their light output as a function of current;

placing a plurality of such LEDs having substantially the same light output as a function of current in a row on a substrate;

placing a row of integrated circuit chips on the substrate beside the row of LED dice;

providing current to each LED from a separate output driver on one of the integrated circuit chips;

controlling the current from all the output drivers on each integrated circuit chip with a chip reference voltage; and adjusting the chip reference voltages for individual chips, if required, for providing substantially the same light output from each LED die.

16. A method as recited in claim 15 comprising providing a system reference voltage to all of the integrated circuit chips for controlling all the chip reference voltages in synchronism.

17. A method as recited in claim 15 wherein the step of adjusting a chip reference voltage comprises selecting a resistance value in a constant current source for providing a desired chip reference voltage.

18. A method as recited in claim 15 comprising switching current from each output driver to its respective LED in response to a data signal.

* * * * *